United States Patent
Batenburg et al.

(10) Patent No.: US 12,473,734 B2
(45) Date of Patent: Nov. 18, 2025

(54) SYNTHETIC FLASHING MATERIAL

(71) Applicant: Redeahold Apeldoorn B.V., Wapenveld (NL)

(72) Inventors: Lawrence Fabian Batenburg, Eindhoven (NL); Roeland Hans Ferdinand Van Delden, Apeldoorn (NL)

(73) Assignee: Redeahold Apeldoorn B.V., Wapenveld (NL)

( * ) Notice: Subject to any disclaimer, the term of this patent is extended or adjusted under 35 U.S.C. 154(b) by 784 days.

(21) Appl. No.: 17/413,471

(22) PCT Filed: Dec. 13, 2019

(86) PCT No.: PCT/NL2019/050836
§ 371 (c)(1),
(2) Date: Jun. 11, 2021

(87) PCT Pub. No.: WO2020/122727
PCT Pub. Date: Jun. 18, 2020

(65) Prior Publication Data
US 2022/0056697 A1     Feb. 24, 2022

(30) Foreign Application Priority Data
Dec. 13, 2018    (NL) ...................................... 2022206

(51) Int. Cl.
*E04D 5/10*     (2006.01)
*B32B 27/08*     (2006.01)
(Continued)

(52) U.S. Cl.
CPC ................ *E04D 5/10* (2013.01); *B32B 27/08* (2013.01); *C08L 29/14* (2013.01);
(Continued)

(58) Field of Classification Search
CPC ............ E04D 5/10; E04D 13/14; B32B 27/08
See application file for complete search history.

(56) References Cited

U.S. PATENT DOCUMENTS

| | | | |
|---|---|---|---|
| 4,248,926 A | 2/1981 | Tajima et al. | |
| 4,265,967 A * | 5/1981 | Kumins | ................. D06N 3/045 524/270 |

(Continued)

FOREIGN PATENT DOCUMENTS

| | | |
|---|---|---|
| DE | 30 19 790 A1 | 12/1981 |
| EP | 0 285 929 A2 | 10/1988 |

(Continued)

OTHER PUBLICATIONS

International Search Report issued in PCT/NL2019/050836; mailed Feb. 21, 2020.

*Primary Examiner* — Christine T Cajilig
(74) *Attorney, Agent, or Firm* — Studebaker Brackett PLLC

(57) ABSTRACT

The invention is directed to a synthetic flashing material, to a method of preparing the synthetic flashing material, and to a method for using the synthetic flashing material, and to the use as insulating material. The synthetic flashing material comprises an amount of polymer material of 75 wt. % or more, wherein the content of metals in the synthetic flashing material is 10 wt. % or less.

21 Claims, 1 Drawing Sheet

(51) Int. Cl.
*C08L 29/14* (2006.01)
*E04D 13/14* (2006.01)
(52) U.S. Cl.
CPC ....... *C08L 2201/02* (2013.01); *C08L 2201/08* (2013.01); *E04D 13/14* (2013.01)

(56) References Cited

U.S. PATENT DOCUMENTS

| | | | | |
|---|---|---|---|---|
| 10,119,012 | B2* | 11/2018 | Assor | C08K 9/12 |
| 2003/0181564 | A1* | 9/2003 | Munzenberger | C08L 101/00 |
| | | | | 524/440 |
| 2011/0104422 | A1* | 5/2011 | Kalkanoglu | E04D 1/20 |
| | | | | 427/372.2 |
| 2013/0337258 | A1* | 12/2013 | Schwendeman | C09D 5/004 |
| | | | | 427/178 |
| 2014/0272238 | A1* | 9/2014 | Hohmann, Jr. | E04B 1/7046 |
| | | | | 264/211 |
| 2018/0002570 | A1* | 1/2018 | Aerts | C09D 7/63 |
| 2019/0119439 | A1* | 4/2019 | Queen | C08G 63/66 |
| 2020/0181018 | A1* | 6/2020 | Caviezel | B32B 27/302 |
| 2021/0002898 | A1* | 1/2021 | Knebel | B32B 27/30 |

FOREIGN PATENT DOCUMENTS

| | | | | |
|---|---|---|---|---|
| WO | 95/31620 | A1 | 11/1995 | |
| WO | 2008/130232 | A1 | 10/2008 | |
| WO | 2010/110661 | A2 | 9/2010 | |
| WO | WO-2016108686 | A1 * | 7/2016 | ............. B32B 15/02 |

* cited by examiner

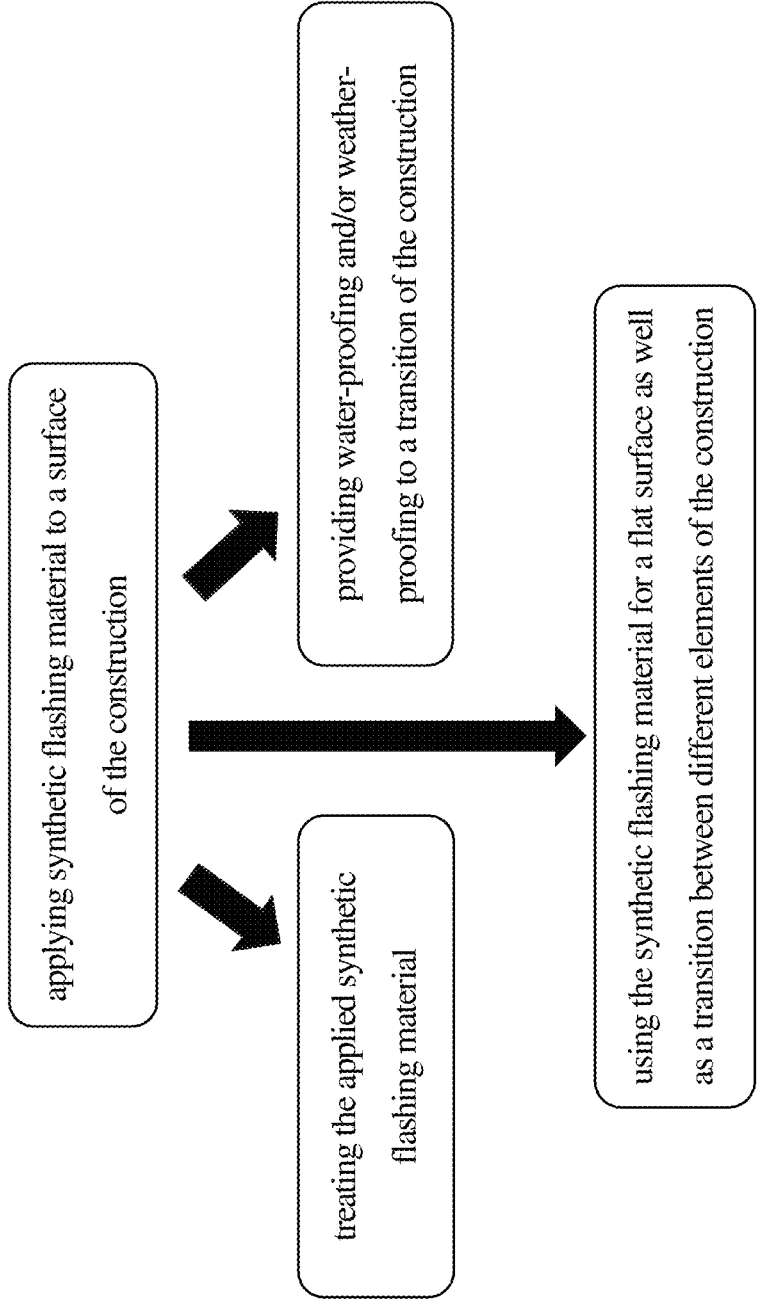

SYNTHETIC FLASHING MATERIAL

CROSS-REFERENCE TO RELATED APPLICATIONS

This application is the U.S. National Stage of International Application No. PCT/NL2019/050836 filed Dec. 13, 2019, which claims benefit of priority to Dutch Patent Application No. 2022206 filed Dec. 13, 2018, the entire contents of which is incorporated herein by reference.

The invention is directed to a synthetic flashing material, to a method of preparing the synthetic flashing material, and to a method for using the synthetic flashing material.

Within the construction industry, green and sustainable construction has emerged as an important field of incorporating green technology and sustainability into the construction process. By constructing environmentally responsible buildings and focusing on durable resources, the construction industry can contribute to global standards on durability and environment.

In construction, lead is used frequently, for example, for roofs, cornices, tank linings, electrical conduits, solder, and paint, because of its unique properties. Despite its numerous advantages, such as flexibility and corrosion inhibition, lead has several disadvantages. Relatively low concentrations of lead are toxic to most organisms, for example the reproductive system of organisms can become damaged upon exposure to lead. Upon absorption into the body by inhalation or via the digestive system, the lipophilicity of lead contributes to its storage in predominantly tissues. The slow dissolution of lead in the course of time, increases the risk of ruptures.

As a consequence of lead being high-valuable, yet less-desirable, multiple efforts have been undertaken in designing construction materials with reduced amounts of lead.

U.S. Pat. No. 4,248,926, for example, describes a flashing sheet that is composed of a base sheet consisting of a synthetic fibre fabric and at least one modified bitumen layer laminated on a surface of the base sheet. The synthetic fibre fabric has high expandability and stretchability in all directions. The bitumen layer contains a mixture of bitumen and rubber. The rubber is blended into the bitumen so as to impart flexibility and expandability at ambient temperature to the bitumen.

WO-A-2008/130232 describes a composite water-retaining sheet material that comprises a layer of bituminous material and a covering gritty layer comprising synthetic granules. The granules can be prepared from a material with a melt flow index between 40-60 and/or the bituminous material can be modified with amorphous poly-α-olefins (APAO), styrene-ethylene-butylene-styrene (SEBS), styrene-butadiene-styrene (SBS), or atactic polypropylene (APP).

WO-A-20101/10661 describes a reinforced covering material that comprises a reinforcement layer with apertures and a polyurethane-based layer arranged at least at one side of the reinforcement layer. The polyurethane-based layer has 20-100% by weight of the polyurethane-based layer of thermosetting polyurethane and extends through the apertures of the reinforcement layer.

DE-A-3 019 790 describes sheet material comprising 20-85 wt. % plasticised polyvinyl butyral resin and 15-80 wt. % of a bituminous material.

Some commercial lead substitute flashing products currently exist on the market, such as Leadax™ available from VisscherHolland, Perform™ available from Meir roofing & Insulation Supplies, and Ubiflex™ available from Ubbink Ltd.

However, there remains a need in the art for construction materials that can be used as proper lead substitutes, i.e. significantly lowering the heavy metal content, such as lead, in particular materials that have mechanical properties highly similar to sheet lead, or conventional lead flashings.

The use of bituminous materials also has disadvantages. Bituminous material is typically produced from crude oil or coal, which could be an environmental concern. Furthermore, application of flashing or roofing materials comprising bituminous materials is typically performed using a flame from e.g. a propane torch. This leads to generation of hazardous fumes and fire hazard during installation. Another disadvantage of bituminous materials is that they are typically dark, and absorb a lot of heat from solar radiation. In addition, bituminous materials tend to degrade from exposure to UV-radiation.

It is an objective of the invention to provide a synthetic flashing material having a low content of heavy metals, preferably substantially free of heavy metals, that is suitable as a lead-substitute construction material, such as a lead-substitute flashing material.

A further objective of the invention is to address one or more drawbacks observed in the art.

The inventors found that one or more of these objectives can, at least in part, be met by a synthetic flashing material.

Accordingly, in a first aspect the invention is directed to a synthetic flashing material, comprising an amount of polymer material of 75 wt. % or more, wherein the content of metals in the synthetic flashing material is 10 wt. % or less, preferably 5 wt. % or less.

In a further aspect the invention is directed to a method of preparing the synthetic flashing material as described herein, comprising preparing a polymer material, preferably by calendaring, wherein the polymer material has
  i) a modulus of elasticity of 0.8-2.0 MPa, preferably in the range of 1.0-1.8 MPa, and/or
  ii) a shore A hardness in the range of 35-55, preferably in the range of 40-50, and/or
  iii) an elongation at break as measured according to ISO 527 of 250-400%, preferably 275-375%.

In yet a further aspect the invention is directed to a method for using the synthetic flashing material as described herein, for providing water-proofing and/or weather-proofing to a construction, comprising:
  i) applying the synthetic flashing material to a surface of the construction, and optionally
  ii) treating the applied synthetic flashing material, wherein the treating is performed mechanically, thermally, chemically, (ultra)sonically, and/or using electromagnetic radiation.

The sole drawing has a flowchart representing a method for providing water-proofing and/or weather-proofing to a construction.

When referring to a noun (e.g. a material) in the singular, the plural is meant to be included, or it follows from the context that it should refer to the singular only.

The term "room temperature" as used herein is defined as the average indoor temperature to the geographical region where the invention is applied. In general, the room temperature is defined as a temperature of between about 18.25° C.

The term synthetic flashing material as used herein refers to flashing materials that mainly comprise materials that are produced using chemical processes, as opposed to materials that are obtained from naturally occurring resources such as crude oil or ores using separation processes, e.g. crude oil fractions and/or metals.

Preferably, in the synthetic flashing material, the content of materials obtained from naturally occurring resources is 0-15%, such as 10% or less, based on the total weight of the synthetic flashing material. In particular, the content of materials obtained from naturally occurring resources may be 0-7.5%, such as 6% or less, 5% or less, 4% or less, or 3% or less. More preferably, the synthetic flashing material comprises 0-2.5% of materials obtained from naturally occurring resources, such as 2% or less, 1.5% or less, 1% or less, and 0.5% or less. Even more preferably, the synthetic flashing material as described herein is substantially free of materials obtained from naturally occurring resources.

Nevertheless, materials from naturally occurring resources may be incorporated in certain components of the synthetic flashing material. For instance, in the case of synthetic polymers, additives such as plasticisers may be incorporated in the polymer in order to improve physical properties of the polymer. When such additives, also when obtained from naturally occurring resources, are incorporated into a synthetic polymer, they are considered to be part of the synthetic polymer.

In accordance with the invention, a synthetic flashing material is provided, in particular comprising poly(vinyl butyrate), and substantially free of heavy metals, with material properties suitable for construction purposes, such as flashing material.

The invention provides a synthetic flashing material, comprising an amount of polymer material of 75 wt. % or more, wherein the content of metals in the synthetic flashing material is 1.0 wt. % or less, preferably 5 wt. % or less.

The shape of the synthetic flashing material may depend on the application of the synthetic flashing material. There are many descriptive terms that can be applied to the shape and/or dimensions thereof, such as the following non-exhaustive list comprising sheet, plate, role, layer, and rod. Preferably, the synthetic flashing material is shaped in the form of a sheet or rod.

The average thickness of the synthetic flashing material, in the case a sheet-like shape is desired, can be about 1 cm or less, such as 2-3 mm. In particular, the average thickness may be about 0.1 mm or more, and 9 mm or less, 8 mm or less, 7 mm or less, or 6 mm or less. Preferably, the average thickness of the synthetic flashing material is 0.1 mm or more, and 5 mm or less, such as 4 mm or less, or 3.5 mm or less. More preferably, the average thickness is 0.2 mm or more, and 3 mm or less, such as 0.2-2 mm, or 0.3-2.5 mm.

The synthetic flashing material as described herein can be pliable, moldable, shapeable, deformable, formable, and/or configurable, and the like.

The synthetic flashing material may optionally comprise at least one sheet for storage. The presence of the release sheet may provide protection to the synthetic flashing material when stored. The release sheet may suitably be removed from the synthetic flashing material by peeling off before, during and/or after applying the synthetic flashing material to a surface, such as the surface of a construction. The release sheet may be present on the top, bottom and/or sides of the synthetic flashing material, preferably on the top and/or bottom. The release sheet may comprise one or more materials selected from the group consisting of polytetrafluoroethylene, silicones, waxed paper, parchment paper, plastic sheets, such as bubble wrap, and other release sheets known in the art.

The synthetic flashing material can additionally comprise one or more protection layers, typically covering the polymer material. Such a protection layer may typically be used to protect the polymer material and/or the synthetic flashing material, e.g. against heat and ultraviolet radiation. Such a protection layer will typically comprise one or more ultraviolet absorbers. Examples of ultraviolet absorbers include benzotriazoles, hydroxybenzophenones, hydroxyphenyl triazines, esters of substituted and unsubstituted benzoic acids, and any combination thereof.

The synthetic flashing material of the invention may have the property of high deformability over a wide temperature range, such as −20-80° C., including low temperatures, such as temperature below and about 0° C. Preferably, the deformability of the synthetic flashing material as described herein is absent upon treating the synthetic flashing material, as described herein.

The synthetic flashing material as described herein may further be characterized by a degree of polymerization between 2-1500, such as 2-1000, and 2-500. The degree of polymerization may be used by the person skilled in the art to determine the extent to which the synthetic flashing material is prepolymerized. A degree of polymerization of the synthetic flashing material of less than 2 may adversely affect the handling of the synthetic flashing material. A degree of polymerization of more than 500 may require the addition of an adhesive bonding agent. In particular, a degree of polymerization of 10 or more, or 20 or more, and 450 or less, 400 or less, 350 or less, 300 or less, 250 or less, 200 or less, 150 or less, 100 or less, or 50 or less may be preferred. The most preferred degree of polymerization of the synthetic flashing material is 25-350.

The polymerization degree of 2-1500 indicates that the synthetic flashing material has polymerized to some extent but is not completely polymerized. The result is a layer of polymeric material that hardly or not flows. The material has sufficient adhesive strength such that it can be applied on a surface of a construction. The exact rheology properties can be finetuned by the specific chemistry of the components in the synthetic flashing material. The viscosity of the synthetic flashing material as measured with a rheometer in oscillatory mode at 20° C. may be in the range of 10-100 000 Pa·s.

In an embodiment, the synthetic flashing material has a gradient in polymerization degree from the side facing the surface to the side facing away from the surface, such that the side facing the surface has a lower polymerization degree and the side facing away from the surface has a higher polymerization degree. The side facing away from the surface (top or bottom of the synthetic flashing material) then advantageously has better resistance to the outdoor climate, and is more rigid (stiff). The side facing the surface (top or bottom of the synthetic flashing material) then advantageously bonds better to the surface and any unevenness in the surface can be better accommodated.

A (virtually) continuous difference in polymerization rate throughout the thickness of the synthetic flashing material is also a possibility.

At least one adhesive bonding agent may be optionally present to bind the synthetic flashing material to the surface of a construction, or underlying material. The at least one adhesive bonding agent may be present in the polymer material. In case the curing of the synthetic flashing material does not result in complete curing, the adhesive bonding agent may contribute to enhance bonding of the synthetic flashing material to the underlying material. In particular, the adhesive bonding agent may become active upon curing.

The adhesive bonding agent may comprise one or more materials selected from the group consisting of epoxy resins, aliphatic amines, polyamides, polyaspartics, and polyurethanes.

The adhesive bonding agent may be present in an amount of 0.5-5% by total weight of the synthetic flashing material. When the amount of adhesive bonding agent is less than 0.5 wt. %, then the synthetic flashing material may adhere insufficiently to the surface. An amount of adhesive bonding agent of more than 5% by total weight of the synthetic flashing material may result in floating of the synthetic flashing material in the adhesive, and reduces flatness of the synthetic flashing material. In particular, the adhesive bonding agent may be present in an amount of 1-2% by total weight of the synthetic flashing material. The preferred amount of the adhesive bonding agent in the synthetic flashing material may be 4 wt. % or less, 3 wt. % or less, 2 wt. % or less, or 1 wt. % or less. The most preferred amount is about 1.5% by total weight of the synthetic flashing material.

Alternatively, or additionally, the synthetic flashing material may be bound to the surface of a construction using e.g. screws.

The synthetic flashing material can be shaped to match the need for use in construction, or for construction purposes. The characteristics of the surface to which the synthetic flashing material can be applied may determine the shaping of the synthetic flashing material. Shaping may, for example, be performed by tearing, deforming, and/or cutting. Suitably, shaping is performed by tearing and/or cutting.

The synthetic flashing material as described herein comprises an amount of polymer material of 50% or more based on total weight of synthetic flashing material, such as 65% or more, and 75% or more, based on the total weight of the synthetic flashing material. In particular, the polymer material content may be 100% or less, and 75% or more, such as 80% or more, and 85% or more by total weight of the synthetic flashing material. Preferably, the synthetic flashing material comprises polymer material in an amount of 100 wt. % or less, and 90 wt. % or more, such as 91 wt. % or more, 92 wt. % or more, 93 wt. % or more, and 94 wt. % or more. More preferably, the amount of polymer material in the synthetic flashing material is 100 wt. % or less, and 95 wt. % or more, 96 wt. % or more, 97 wt. % or more, 98 wt. % or more, or 99 wt. % or more. Even more preferably, the synthetic flashing material comprises 95-98.5% of polymer material, based on the total weight of the synthetic flashing material. Generally, the higher the polymer content in the synthetic flashing material, the easier it is to recycle the synthetic flashing material.

The synthetic flashing material as described herein may comprise an amount of thermosetting material of 0-40% based on total weight of synthetic flashing material, such as 35% or less, 25% or less, or 15% or less. In particular, the synthetic flashing material comprises 0-10% of thermosetting material, such as 0-5%, 2.5% or less, 1.5% or less, 1% or less, or 0.5% or less. Preferably, the synthetic flashing material as described herein comprises a low amount of thermosetting material or no amount of thermosetting material.

The synthetic flashing material as described herein comprises a metal content of 0-15% such as 10% or less, based on the total weight of the synthetic flashing material. In particular, the metal content may be 0-7.5%, such as 6% or less, 5% or less, 4% or less, and 3% or less. Preferably, the synthetic flashing material comprises a metal content of 0-2.5%, such as 2% or less, 1.5% or less, 1% or less, and 0.5% or less. More preferably, the synthetic flashing material is substantially free of metals.

Preferably, the synthetic flashing material comprises less than 15% of bituminous material, such as asphalt or coal tar pitch, based on the total weight of the synthetic flashing material. In particular, the synthetic flashing material may comprise 0-10% of bituminous material, such as 0-5%, or 0-2% of bituminous material. More preferably, the synthetic flashing material is substantially free of bituminous material.

The synthetic flashing material comprises polymer material. The polymer material may comprise one or more selected from polyisobutenes (PIB), poly(vinyl chlorides), polychloroprene, polycaprolactones, polyesters, silicones, styrene butadiene copolymers (SBC), such as polystyrene-butadiene-styrene) (SBS), poly(styrene-ethylene-butadiene-styrene) (SEBS) and poly(styrene-ethylene/propylene-styrene) (SEPS), thermoplastic elastomers (TPE), such as vulcanised thermoplastic elastomers (TPE-V) and styrenic block copolymers (TPE-S), thermoplastic polyolefins (TPO), poly(vinyl butyrate), thermoplastic polyurethanes (TPU), and copolymers of ethylene and vinylacetate (EVA). Preferably, the polymer material may comprise one or more selected from the group consisting of polyisobutenes, polycaprolactones, polyesters, silicones, thermoplastic elastomers, such as vulcanised thermoplastic elastomers and styrenic block copolymers, thermoplastic polyolefins, poly(vinyl butyrate), and thermoplastic polyurethanes.

Polyvinyl chlorides), or poly(vinyl chloride) polymers, useful according to the invention include those described in "vinyl chloride polymers" entry of Kirk-Othmer Encyclopedia of Chemical Technology, Vol. 24, $4^{th}$ ed., (1997), pp. 1017-1053, the content of which is herewith completely incorporated by reference. For example, vinyl chloride resins such as homopolymers of vinyl chloride, copolymers of vinyl chloride and other vinyl monomers, halogenated compounds of their homopolymers, and alloys or blends with other plastics suitably may be used in the invention.

In addition, suitable poly(vinyl chloride) polymers include homopolymers of vinyl chloride and those vinyl chloride polymer resins having 70% or more by total weight of the polymer of repeating units polymerized from a vinyl chloride monomer, or 80% or more, or 90% or more, or even 95% or more of repeating units polymerized from a vinyl chloride monomer.

The poly(vinyl chloride) may comprise repeating units polymerized from a vinyl chloride monomer, and may further comprise comonomers up to 30% by total weight of the copolymer, said comonomers begin selected, e.g., from one or more of the esters of acrylic acid, for example, methyl acrylate, ethyl acrylate, butyl acrylate, octyl acrylate, cyanoethyl acrylate and the like, vinyl esters, such as vinyl acetate and vinyl propionate, esters of methacrylic acid, such as methyl methacrylate, ethyl methacrylate, hydroxyethyl acrylate, butyl methacrylate and the like, nitriles, such as acrylonitrile and methacrylonitrile, acrylamides, such as methyl acrylamide, N-methylol acrylamide, N-butoxy methacrylamide and the like, halogen containing vinyl monomers, such as vinylidene chloride, vinylidene fluoride, and vinyl bromide, vinyl ethers, such as ethylvinyl ether, chloroethyl vinyl ether and the like, the vinyl ketones, styrene derivatives including α-methyl styrene, vinyl toluene, chlorostyrene, vinyl naphthalene, olefins, such as ethylene, butene, isobutylene, propylene and hexane, and other copolymerizable monomers or mixtures of monomers having suitable reactivity ratios with vinyl chloride and known to those skilled in the art.

Styrene butadiene copolymers that may be used in this invention include poly(styrene-butadiene-styrene), poly(styrene-ethylene/butadiene-styrene), poly(styrene-ethylene/propylene-styrene), hydrogenated styrene-isoprene copolymer, styrene-ethylene propylene (SEP) block copolymer, poly(styrene-ethylene/ethylene propylene-styrene) (SEEPS) and hydrogenated styrene-butadiene copolymer. Hydrogenated products that are copolymers or homopolymers of isoprene and butadiene-containing monomer units may also be used.

The general family of thermoplastic elastomers is commonly identified with the abbreviation TPE. This abbreviation includes a large number of polymer, amongst others, vulcanized thermoplastic elastomers and styrenic block copolymers described above, thermoplastic polyamides, thermoplastic polyesters, and thermoplastic polyurethanes.

Good results have been obtained using the synthetic flashing material as described herein, comprising a polymer material that comprises poly(vinyl butyrate). Poly(vinyl butyrate) can be produced by reacting poly(vinyl alcohol) with n-butyraldehyde in the presence of an acid catalyst, followed by neutralization of the acid catalyst, separation, stabilisation and drying of the poly(vinyl butyrate). Poly(vinyl butyrate) is commercially available from Monsanto Company as Butvar®. The conditions of the reaction between poly(vinyl alcohol) and n-butyraldehyde, and the concentration of the n-butyraldehyde and poly(vinyl alcohol) used are closely controlled to form polymers containing predetermined proportions of hydroxyl, acetate, and butyral groups. Hence, the term "poly(vinyl butyrate)" is used herein interchangeably with the term "poly(vinyl butyral)", and is meant to refer to a polymer that comprises butyral groups, but can further comprise, for example, hydroxyl groups and acetate groups. Accordingly, poly(vinyl butyrate) as herein referred comprises at least repeating unit A as depicted below, and can further comprise unit B and/or C depicted below.

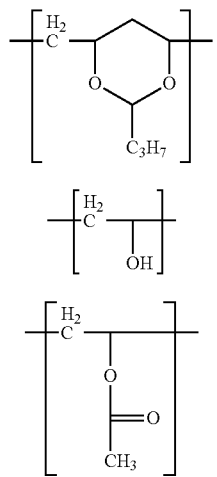

On a weight basis, the poly(vinyl butyrate) typically comprises 20% or less (such as 10-20% or 12-19%) of hydroxyl groups calculated as poly(vinyl alcohol). On a weight basis, the poly(vinyl butyrate) typically comprises 10% or less (such as 0-5% or 0-3%) of acetate groups calculated as poly(vinyl acetate). On a weight basis, the poly(vinyl butyrate) typically comprises 75% or more (such as 80-90% or 80-88%) of acetal groups, preferably butyral groups. Optionally, the poly(vinyl butyrate) can include a minor amount of acetal groups other than butyral, for example 2-ethyl hexanal.

In a preferred embodiment, the synthetic flashing material comprising polymer material comprises poly(vinyl butyrate). The poly(vinyl butyrate) may be virgin poly(vinyl butyrate), but it is also possible to use poly(vinyl butyrate) that originates from a recycle stream, such as from the automotive industry, where poly(vinyl butyrate) is e.g. used to laminate glass. Such poly(vinyl butyrate) is also known as waste poly(vinyl butyrate). The amount of poly(vinyl butyrate) in the synthetic flashing material may be 100% or less, and 25% or more, such as 40% or more by total weight of the synthetic flashing material. In particular, the amount of poly(vinyl butyrate) in the synthetic flashing material may be 100% or less, and 45% or more, such as 50% or more, and 55% or more. Preferably, the amount of poly(vinyl butyrate) is 100 wt. % or less, and 60 wt. % or more, 65 wt. % or more, or 67 wt. % or more. More preferably, the amount of poly(vinyl butyrate) in the synthetic flashing material is 100% or less, and 70% or more, such as 75% or more, 77% or more, or 80% or more. Even more preferably, the amount of poly(vinyl butyrate) is 85-100 wt. %, such as 85-95 wt. %, or 90-98.5 wt. %.

In another preferred embodiment, the polymer material comprises poly(vinyl butyrate) having a weight average molecular weight greater than 70 000 g/mol, preferably in the range of 100 000-250 000 g/mol, as measured by size exclusion chromatography using low angle laser light scattering.

Another material that may be comprised in the polymer material of the synthetic flashing material of the invention are copolymers of ethylene and vinylacetate. These copolymers are well-known in the art. These copolymers can, for example, contain 25-35% by total weight of the copolymer of vinyl acetate, such as 27-32%.

Thermoplastic polyolefins that can be used include polypropylene, polyethylene, and polybutenes. Generally at least one type of polypropylene is employed. The polypropylene is generally in the isotactic form of the homopolymers, but other forms of polypropylene such as syndiotactic or atactic may also be used. Polypropylene impacts copolymers wherein in a second copolymerization step, ethylene is reacted with polypropylene, may also be employed. Polypropylene random copolymers that usually contain 1-7% ethylene copolymerized with polypropylene can also be used. Reactor grade impact modified polypropylene can also be used.

Other polymers that may be comprised in the polymer material of the synthetic flashing material of the invention include ethylene/propylene rubber without a non-conjugated diene termonomer (EPM) and ethylene/propylene rubber with a non-conjugated diene termonomer (EPDM). Non-conjugated dienes for use in EPDM are well-known in the art and include 1,4-hexadiene, ethylidene norbornene, dicyclopentadiene, 5-ethylidene-2-norbornene, 1,3-cyclopentadiene, 5-vinylnorbornene, and combinations thereof.

Further possible materials for use in the synthetic flashing material include melt processable rubber, neoprene, and fluoroelastomers such as copolymers of vinylidene fluoride and hexafluoropropylene.

The elastic modulus of the polymer material in the synthetic flashing material as described herein as measured according to ISO 527 is preferably in the range of 0.6-2.0 MPa, preferably in the range of 0.8-1.8 MPa, such as in the range of 1.0-1.6 MPa.

The Shore A Hardness of the polymer material in the synthetic flashing material as described herein as measured according to ISO 7619-1 is preferably in the range of 25-65, preferably in the range of 30-60, such as in the range of 35-50.

The elongation at break of the polymer material in the synthetic flashing material as described herein as measured according to ISO 527 is preferably in the range of 250-400%, preferably in the range of 275-375%, such as in the range of 290-360%.

The melt flow index of the polymer material in the synthetic flashing material as described herein as measured according to ISO 1133 at a load of 2.16 kg and at a temperature of 180° C. of 0.1-25 g/10 minutes, preferably 0.1-20 g/10 minutes, such as 0.1-1.5 g/1.0 minutes or 0.1-10 g/10 minutes.

The yield stress of the polymer material in the synthetic flashing material as described herein as measured according to ISO 527 of 9-22 MPa, preferably in the range of 10-20 MPa, such as in the range of 12-18 MPa.

The melting temperature ($T_m$) of the polymer material in the synthetic material as described herein as measured according to methods known in the art of 50-150° C., such as 50-125° C., preferably in the range of 55-115° C., such as in the range of 75-110° C.

The density of the polymer material in the synthetic flashing material as described herein as measured according to ISO 1183 is in the range of 0.90-2.00 g/cm$^3$, preferably in the range of 1.00-1.50 g/cm$^3$, more preferably in the range of 1.01-1.20 g/cm$^3$, such as in the range of 1.02-1.10 g/cm$^3$.

The polymer material in the synthetic flashing material as described herein can further be characterised in that a Charpy impact strength measurement at room temperature and/or at −20° C., such as determined according to ISO 148, does not yield breakage of the material. Instead, the thermoplastic material remains intact.

The strain at break of the polymer material in the synthetic flashing material as described herein as measured according to ISO 527 is preferably 50-500%, more preferably 60-450%, such as 70-400%.

The polymer material in the synthetic flashing material of the invention has at least one of an elastic modulus in the range of 0.6-2.0 MPa, a Shore A Hardness in the range of 25-65, an elongation at break in the range of 250-400%, a melt flow index of 0.1-25 g/10 minutes, a yield stress in the range of 10-20 MPa, and a melting temperature ($T_m$) of 50-150° C., a density in the range of 0.90-2.00 g/cm$^3$, no breakage when subjected to a Charpy impact strength measurement test, and a strain at break of 50-500%. Suitably, the polymer layer in the synthetic flashing material of the invention has at least two of an elastic modulus in the range of 0.6-2.0 MPa, a Shore A Hardness in the range of 25-65, and an elongation at break in the range of 250-400%, a melt flow index of 0.1-25 g/10 minutes, a yield stress in the range of 10-20 MPa, and a melting temperature ($T_m$) of 50-150° C., a density in the range of 0.90-2.00 g/cm$^3$, no breakage when subjected to a Charpy impact strength measurement test, and a strain at break of 50-500%. Preferably, the polymer material of the synthetic flashing material as described herein has at least three of an elastic modulus in the range of 0.6-2.0 MPa, a Shore A Hardness in the range of 25-65, an elongation at break in the range of 250-400%, a melt flow index of 0.1-25 g/10 minutes, a yield stress in the range of 10-20 MPa, and a melting temperature ($T_m$) of 50-150° C., a density in the range of 0.90-2.00 g/cm$^3$, no breakage when subjected to a Charpy impact strength measurement test, and a strain at break of 50-500%. More preferably, the polymer material of the synthetic flashing material as described herein has at least four of an elastic modulus in the range of 0.6-2.0 MPa, a Shore A Hardness in the range of 25-65, an elongation at break in the range of 250-400%, a melt flow index of 0.1-25 g/10 minutes, a yield stress in the range of 10-20 MPa, and a melting temperature ($T_m$) of 50-150° C., a density in the range of 0.90-2.00 g/cm$^3$, no breakage when subjected to a Charpy impact strength measurement test, and a strain at break of 50-500%. Even more preferably, the polymer material of the synthetic flashing material as described herein has an elastic modulus in the range of 0.6-2.0 MPa, a Shore A Hardness in the range of 25-65, an elongation at break in the range of 250-400%, a melt flow index of 0.1-25 g/10 minutes, a yield stress in the range of 10-20 MPa, a melting temperature ($T_m$) of 75-110° C., a density in the range of 0.90-2.00 g/cm, no breakage when subjected to a Charpy impact strength measurement test, and a strain at break of 50-500%.

In an embodiment, the polymer material in the synthetic flashing material as described herein has at least a melt flow index in the range of 0.1-25 g/10 minutes.

In an embodiment, the polymer material in the synthetic flashing material as described herein has an elastic modulus in the range of 0.6-2.0 MPa, a Shore A Hardness in the range of 25-65, and an elongation at break in the range of 250-400%. Depending on the application region and local weather type one of these physical properties may be sufficient, or more of such physical properties, for example those mentioned herein, may be required. The person skilled in the art will be able to determine the needs.

These physical properties of the polymer material in the synthetic flashing material as described herein can be adjusted and achieved in various manners.

It is possible to add one or more elastomers to the synthetic flashing material in order to soften the polymer material. Examples of suitable elastomers typically include copolymers prepared from at least two monomers selected from the groups of ethylene, propylene, butadiene, isobutene, isoprene, chloroprene, vinylacetate, styrene, acrylonitrile and (meth)acrylic acid ester with 1-18 carbon atoms (in the alcohol component). Some examples of these elastomers include, e.g. ethylene-propylene rubbers (EPM) and ethylene-propylene-diene rubbers (EPDM). EPM rubbers are in general substantially free from double bonds, whereas EPDM rubbers can have 1-20 double bonds per 100 carbon atoms. Such rubber elastomers are well-known in the art.

As diene monomers for EPDM rubbers, for example, the following can be used: conjugated dienes, such as isoprene and butadiene, non-conjugated dienes with 5-25 carbon atoms, such as penta-4,4-diene, hexa-1,4-diene, hexa-1,5-diene, 2,5-dimethylhexa-1,5-diene and octa-1,4-diene, cyclic dienes, such as cyclopentadiene, cyclohexadiene, cyclooctadiene and dicyclopentadiene, as well as alkenyl-norbornenes, such as 5-ethyliden-2-norbornenes, 5-butyl-idene-2-norbornenes, 2-methallyl-5-norbornenes and 2-iso-propynyl-5-norbornenes, tricyclodienes, such as 3-methyl-tricyclo(5.2.1.0.2.6)-3,8-decdiene, and mixtures thereof.

Another group of suitable elastomer rubbers are copolymers of ethylene with (meth)acrylic acid and/or esters thereof. Additionally, these rubbers can comprise carbonic acids such as maleic acid, fumaric acid, and/or derivatives thereof such as esters and anhydrides. The elastomer rubbers can further comprise epoxy-groups containing monomers.

Also elastomer core-shell particles can be used. In such particles the core can for example, comprise polybutadiene, polyisoprene, butadiene/acrylonitrile copolymer, styrene/butadiene copolymer, styrene/isoprene copolymer, ethylene/propylene copolymer, ethylene/α-olefin copolymer, ethylene/α-olefin/polyene copolymer, acrylic rubber, butadiene/(meth)acrylate copolymer, styrene/butadiene block copolymer, and styrene/isoprene block copolymer. The shell in such elastomer core-shell particles can comprise methyl methacrylate polymer, methyl methacrylate/glycidyl methacrylate copolymer, and the like.

In case the polymer material comprises one or more elastomers, the amount of the elastomers can be 30% or less by total weight of the thermoplastic material, preferably in the range of 15-25%, more preferably in the range of 5-15%.

Another possibility for softening the polymer material is to add one or more plasticisers. Plasticisers that can be employed for the purpose of the invention include aromatic diesters, such as diisononyl phthalate, diisodecyl phthalate, linear dinonyl phthalate (L9P), dioctyl terephthalate, dibutyl phthalate, dioctyl phthalate, benzybutylphthalate and dihexyl phthalate, aliphatic diesters, such as diisononyl adipate and diisodecyl adipate, aromatic sulphonamides, such as N-n-butylbenzenesulphonamide, aromatic phosphate esters, such as tricresyl phosphate and trixylyl phosphate, alkyl phosphate esters, such as tributyl phosphate and tri-iso-octyl phopsphate, dialkylether aromatic esters, such as dibutoxyethyl phthalate, dialkylether diesters, tricarboxylic esters, polymeric polyester plasticisers, polyglycol diesters, alkyl alkylether diesters, such as dibutoxyethyl glutarate, di-(2-butoxyethyl) adipate, di-(butylethoxyethoxy)glutarate and di-(butoxyethoxyethyl)adipate, aromatic trimesters, such as trioctyl trimellitate and triisooctyl trimellitate, epoxodised esters, epoxidised oils, such as epoxidised soybean oil, chlorinated hydrocarbons or paraffins, aromatic oils, alkylether monoesters, naphthenic oils, alkylmonoesters, glyceride oils, paraffinic oils, silicone oils, linseed oils, citrate plasticisers, such as tributyl citrate, process castor oil, raw castor oil, derivatives of castor oil, such as butyl ricinoleate, sebacate plasticisers, such as dibutyl sebacate, and any combination thereof.

In case the thermoplastic material comprises one or more plasticisers, the amount of the plasticisers can be 30% or less by total weight of the polymer material, preferably in the range of 5-30%, more preferably in the range of 10-25%.

Physical properties of the thermoplastic material, such as those described herein, can be adjusted and/or achieved by the addition of fillers, functional fillers, and/or nanoparticles to increase, for example, the elastic modulus and the Shore A Hardness. By blending in (miscible) polymers such as (meth)acrylates, poly(vinyl chloride) or polyurethane, the flow properties, the melt flow index, the Shore A Hardness, the elastic modulus, and/or the flexibility can be adjusted. Reactive polymers such as maleic anhydride grafted polymer, glycidyl methacrylate modified polymers (methyl or ethyl) acrylate modified polymers, and the like, can be used to change the flow properties, the melt flow index, the impact properties, the Shore A Hardness, the elastic modulus, and/or the flexibility of the polymer material.

The polymer material in the synthetic flashing material and/or the synthetic flashing material as described herein can further comprise various additives including, but not limited to, one or more selected from the group consisting of ultraviolet blocking agents, antioxidants, flame retardants, blowing agents, processing aids, pigments, dyes, fillers, antibacterial agents, release agents, heat stabilizers, light stabilizers, compatibilizers, inorganic material additives, surfactants, coupling agents, impact-reinforcing agents, lubricants, weather-resistant agents, adhesion aids, adhesives, and combinations thereof.

In particular, the polymer material in the synthetic flashing material comprises a flame retardant. The flame retardant can be a solid, a fluid, preferably a liquid, and combinations thereof. The flame retardant can include a melamine-containing compound, a nitrogen/phosphorus-based (N/P-based) flame retardant, a phosphorus-based flame retardant, a borate, a metal-containing flame retardant, and any combination thereof.

Examples of suitable melamine-containing compounds include melamine cyanurate, melamine phosphate, melamine pyrophosphate, melamine polyphosphate, 2,4,6-triamino-1,3,5-triazine, and mixture of piperazine pyrophosphate and melamine pyrophosphate.

Examples of suitable N/P-based flame retardants include melamine phosphate, melamine pyrophosphate, melamine polyphosphate, piperazine pyrophosphate, melamine pyrophosphate, a phosphonitrilic chloride, a phosphorus ester amide, a phosphoric acid amide, a phosphonic acid amide, a phosphinic acid amide, ammonium polyphosphate (APP), piperizine polyphosphate, and any combination thereof.

Examples of suitable phosphorus-based flame retardants include an organic phosphonic acid, a phosphonate, a phosphinate, a phosphonite, a phosphinite, a phosphine oxide, a phosphine, a phosphite or a phosphate, and any combinations thereof. Specific examples include phenylbisdodecyl phosphate, phenylbisneopentyl phosphate, phenyl ethylene hydrogen phosphate, phenyl-bis(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, dibutylphenyl phosphate, 2-chloroethyldiphenyl phosphate, and diphenyl hydrogen phosphate.

In an embodiment, the flame retardant is selected from triphenyl phosphate (TPP), resorcinol diphenyl phosphate (IMP), bisphenol A polyphosphate (BAPP), bisphenol A diphenyl phosphate (BPADP), bisphenol A diphosphate (BADP), ammonium polyphosphate (APP), piperizine polyphosphate, (2,6-dimethylphenol)-1,8-phenylene bisphosphate, and any combinations thereof.

Examples of suitable metal-containing flame retardants include metal hydrates, such as magnesium hydroxide, aluminium trihydrate ($Al_2O_3 \cdot H_2O$; (ATH), also referred to as aluminium hydroxide $Al(OH)_3$), huntite, hydromagnesite, antimony trioxide, potassium hydroxide, zirconium oxide, titanium oxide, zinc oxide and/or magnesium oxide, metal carbonates, such as magnesium carbonate and/or calcium carbonate, barium and/or borate based compounds, such as barium sulphate, barium borate, meta-barium borate, zinc borate and/or meta-zinc borate, and other flame retardants, such as aluminium anhydrate, molybdenum disulphide, clay, diatomite, kaolinite, montmorillonite, hydrotalcite, talc, silica (e.g. precipitated silica and silicates, fumed silica, etc.), white carbon, celite, asbestos, ground minerals, and/or lithopone.

Preferably, the flame retardant is halogen-free. More preferably, the synthetic flashing material is substantially or completely halogen-free.

The amount of the flame retardants can be 40% or less by total weight of the thermoplastic material, preferably in the range of 2-40%, more preferably in the range of 5-35%, such as 5-30% or 7-25%.

Examples of suitable ultraviolet blocking agents include titanium dioxide, carbon black, and combinations thereof.

Examples of suitable blowing agents include azodicarbonamide, expandable microspheres, p-p'-oxybis(benzenesulphonylhydrazide), p-toluene sulphonyl semicarbizide, sodium bicarbonate, citric acid, and any combination thereof.

The amount of the blowing agents can be 5% or less by total weight of the polymer material, preferably in the range of 0.01-4%, more preferably in the range of 0.05-3%.

Examples of suitable processing aids include metal salts of carboxylic acids, such as zinc stearate or calcium stearate, fatty acids, such as stearic acid, oleic acid or erucic acid, fatty amides, such as stearamide, oleamide, erucamide or N,N'-ethylene bis-stearamide, polyethylene wax, oxidised polyethylene wax, polymers of ethylene oxide, copolymers of ethylene oxide and propylene oxide, vegetable waxes, petroleum waxes, non-ionic surfactants, fluoropolymers, such as polytetrafluoroethylene and the like, and polysiloxanes.

The amount of the processing aids can be 5% or less by total weight of the polymer material, preferably in the range of 0.05-5%, more preferably in the range of 0.1-3%.

Examples of suitable pigments include carbon black, titanium dioxide, and any combination thereof.

The amount of the pigments can be 10% or less by total weight of the polymer material, preferably in the range of 0.5-10%, more preferably in the range of 1-5%.

Examples of suitable dyes include organic dyes, such as coumarins, lanthanide complexes, hydrocarbon and substituted hydrocarbon dyes, polycyclic aromatic hydrocarbons, scintillation dyes (preferably oxazoles and oxadiazoles), aryl- or heteroaryl-substituted poly (2-8 olefins), carbocyanine dyes, phthalocyanine dyes and pigments, oxazine dyes, carbostyryl dyes, porphyrin dyes, acridine dyes, anthraquinone dyes, arylmethane dyes, azo dyes, diazonium dyes, nitro dyes, quinone imine dyes, tetrazolium dyes, thiazole dyes, perylene dyes, perinone dyes, bis-benzoxazolylthiophene (BBOT), xanthene dyes, and any combination thereof.

The amount of the dyes can be 5% or less by total weight of the polymer material, preferably in the range of 0.1-5%, more preferably in the range of 0.2-4%.

Using pigments or dyes, the polymer material and/or synthetic flashing material can be produced in a wide variety of colours. The colour of the polymer material may have an effect on the Solar Reflectance Index (SRI) of the synthetic flashing material Polymer materials with a lighter colour may provide the synthetic flashing material with a lower SRI. In order to avoid excessive heating of a construction due to solar radiation, the synthetic flashing material preferably has a SRI of 25 or higher, such as 25-95. Preferably, the synthetic flashing material has an SRI of 30 or higher, or 40 or higher. More preferably, the synthetic flashing material has an SRI of 50 or higher, such as 60 or higher. The presence of dark pigments or fillers, such as carbon black, in the polymer material can negatively effect the SRI of the synthetic flashing material.

Examples of suitable fillers include carbon black, wollastonite, solid microspheres, hollow microspheres, kaolin, clay-based minerals, bauxite, calcium carbonate, feldspar, barium sulphate, titanium dioxide, talc, pyrophyllite, quartz, natural silica, such as crystalline silica and microcrystalline silica, synthetic silicates, such as calcium silicate, zirconium silicate and aluminium silicate, including mullite, sillimanite, cyanite, andalusite and synthetic alkali metal aluminosilicates, microcrystalline novaculite, diatomaceous silica, perlite, synthetic silica, such as fumed silica and precipitated silica, antimony oxide, bentonite, mica, vermiculite, zeolite, and combinations of metals with various salts, such as calcium, magnesium, zinc, barium, aluminium combined with oxide, sulphate, borate, phosphate, carbonate, hydroxide and the like, and any combination thereof.

If the amount of fillers (in particular the amount of carbon black) in the polymer material is too high, the physical and or optical properties of the synthetic flashing material, such as the modulus of elasticity, shore A hardness, elongation at break, melt flow index, yield stress, $T_m$, and/or SRI can be negatively effected. The amount of the fillers (such as carbon black) can be 50% or less by total weight of the polymer material, preferably in the range of 10-40%, more preferably in the range of 5-10%.

Examples of suitable antioxidants include hindered phenols, such as tetrakis[methylene(3,5-di-tert-butyl-4-hydroxyhydrocinnamate)] methane, bis-[(β-(3,5-di-tert-butyl-4-hydroxybenzyl)-methylcarboxyethyl)] sulphide, 4,4'-thiobis(2-methyl-6-tert-butylphenol), 4,4'-thio-bis(2-tert-butyl-5-methylphenol), 2,2'-thio-bis(4-methyl-6-tert-butylphenol) and thiodiethylene bis(3,5-di-tert-butyl-4-hydroxy)hydrocinnamate, phosphites and phosphorites, such as tris(2,4-di-tert-butylphenyl)phosphite and di-tert-butylphenyl-phosphorite, thio compounds, such as dilauryl-thiodipropionate, dimyristylthiodipropionate and distearyl-thiodipropionate, various siloxanes, polymerised 2,2,4-trimethyl-1,2-dihydroquinoline, N,N'-bis(1,4-dimethylpentyl-p-phenylenediamine), alkylated diphenylamines, 4,4'-bis(α,α-dimethylbenzyl)diphenylamine, diphenyl-p-phenylenediamine, mixed di-aryl-p-phenylenediamines and other hindered amine antidegradants or stabilisers, and or any combination thereof.

The amount of the antioxidants can be 5% or less by total weight of the polymer material, preferably in the range of 0.1-5%, more preferably in the range of 0.2-3%.

Examples of the weather-resistance agents include benzophenone-type weather resistance agents, amine-type weather resistance agents, and combinations thereof.

The synthetic flashing material as described herein may further comprise one or more adhesive layers on the side of the synthetic flashing material which is to be attached to a substrate, such as a roof. This adhesive layer can advantageously reduce or even avoid wind uplift of the synthetic flashing material when applied. Suitably adhesives are well-known in the art and include, e.g., pressure-sensitive adhesives.

In the synthetic flashing material as described herein, the polymer material provides for penetration resistance and durability. As a result, the synthetic flashing material of the invention provides proper sealing and excellent waterproofing properties. Moreover, the synthetic flashing material of the invention is relatively cheap.

In an embodiment, the synthetic flashing material as described herein may comprise dispersed metal particles and/or a (thin) metal layer. Preferably, the synthetic flashing material comprises a low amount of metal, such as substantially no metal. In the case the synthetic flashing material comprises dispersed metal particles, the synthetic flashing material can be treated, fixated, and/or rigidified upon exposure to magnetic fixation.

In another embodiment, a composition is provided comprising the synthetic flashing material as described herein, and a metal layer.

The invention further provides a method of preparing the synthetic flashing material as described herein, comprising preparing a thermoplastic material, preferably by calendaring, wherein the thermoplastic material has
    i) a modulus of elasticity of 0.8-2.0 MPa, preferably in the range of 1.0-1.8 MPa, and/or
    ii) a shore A hardness in the range of 35-55, preferably in the range of 40-50, and/or iii) an elongation at break as measured according to ISO 527 of 250-400%, preferably 275-375%.

The layer of polymer material is a layer as described hereinabove. The polymer material can be provided in the form of an extruded cylinder which is subsequently subjected to the method of the invention. Optionally, the layer of polymer material can be pressed while still hot from the extruder. Alternatively, the polymer material can be manufactured prior to the method of preparing the synthetic flashing material. Typically, the calendaring step is carried out at a temperature in the range of 5-50° C., preferably in the range of 20-40° C.

The product of the invention can be used as a flashing material in buildings and constructions to prevent the passage of water into a structure at locations such as chimneys, vet pipes, walls, windows and door openings. The product has improved moisture barrier properties at fastener locations through a combination of improved fastener sealing dimensional stability and coefficient of friction properties. The dimensional stability can vary based on the thermoplastic material and upon exposure to elevated temperatures.

The synthetic flashing material as described herein can be used for providing weather-proofing or water-proofing where desired, particularly for transitions between different construction elements, such as in roofs, as a covering layer thereon, particularly used for flashing roof lead-ins or "lead flashing", for use on and in chimneys, skylights, dormer windows, air ducts, attics and the like. Other examples of transitions between different construction elements include the transition between a flat surface of a roof and a roof edge and/or the transition between a roof edge and a wall. The synthetic flashing material protects the deck and the interior of the structure which upper surface it covers from the weather, including ultraviolet radiation, wind, rain and other precipitation.

When the synthetic flashing material is used as a covering layer on roofs, it may also be referred to as roofing material. In a preferred embodiment, the synthetic flashing material as described herein is used as roofing material.

When the synthetic flashing material is applied to the surface of a construction, adjacent pieces of material may be arranges to overlap each other. In order to provide a waterproof seam, the overlapping regions may be bonded together. Bonding together of the overlapping regions may be done using hot air, causing the synthetic material to melt, or at least soften, and/or using an organic solvent, e.g. ethanol.

Because of its physical properties, such as the modulus of elasticity, shore A hardness, elongation at break, melt flow index, and/or yield stress, the synthetic flashing material can be used for providing weather-proofing or water-proofing of transitions between different construction elements, even when these transitions have sharp edges in more than one directions, such as for instance the transition between a chimney corner and a flat roof surface. Advantageously, since the synthetic flashing material can be used for such transitions between different construction elements with sharp edges, but also as a roofing material for flat surfaces, the same piece of synthetic flashing material can be used for both flat surfaces and transitions. This means that additional waterproofing elements such as drip edges or conventional flashings are not necessary. This also reduces the amount of seams needed, thereby minimizing the risk of seam failure, which could lead to leakages.

In a preferred embodiment, the synthetic flashing material as described herein can be used as an insulating material for construction purposes, by applying the synthetic flashing material to a surface of a construction. In case the synthetic flashing material is used as an insulating material for construction purposes, the material provides water-proofing and/or weather-proofing.

The invention further provides a method for using the synthetic flashing material as described herein, for providing water-proofing and/or weather-proofing to a construction, comprising:
i) applying the synthetic flashing material to a surface of the construction, and optionally
ii) treating the applied synthetic flashing material, wherein the treating is performed mechanically, thermally, chemically, (ultra)sonically, and/or using electromagnetic radiation,
wherein the treated synthetic flashing material (i.e. synthetic flashing material of ii)) is less deformable than the synthetic flashing material before treatment (i.e. synthetic flashing material of for example, i)).

In an embodiment, the invention is directed to the use of the synthetic flashing material of the invention for providing water-proofing and/or weather-proofing.

The invention is particularly directed to the use of the synthetic flashing material of the invention in roofs, and more in particular for water-proofing and/or weather-proofing the transitions between a roof and a chimney, skylight and/or dormer window.

In an embodiment, the synthetic flashing material of the invention can be used as a substitute for lead flashing.

Advantageously, the synthetic flashing material of the invention is easily recyclable. Upon heating the material, the thermoplastic material can be recycled to its original form and/or function. This is in contrast to various thermoset materials described in the prior art.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the its invention and does not pose a limitation on the scope of the invention unless otherwise claimed. No language in the specification should be construed as indicating any non-claimed element as essential to the practice of the invention.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

EXAMPLES

Example 1

Poly(vinyl butyrate) (PVB) foil material was produced from granules of recycled PVB, originating from car windows. Using an extruder and a dye, the PVB granules were shaped into rolls of 1 m wide with a thickness of ca. 2 mm. White and grey rolls were produced.

The rolls of foil material were rolled out and applied as roofing and flashing on a roof with raised edges. Due to the physical properties of the material, a single piece of material could be shaped to act both as roofing and as flashing material, covering the flat roof surface as well as the raised edges of the roof, without the need of applying separate pieces or other materials as a drip edge or flashing.

On one roof, the foil was applied to the surface using polyurethane (PU) adhesive, without overlap between adjacent foil strips. On the other roof the foil was applied to the roof surface using screws and washers, and an overlap between the foil strips was created. The overlapping regions were bonded using ethanol and/or hot air.

Both roofs were filled with water, and no leakage was observed.

The invention claimed is:

1. A synthetic flashing material, comprising polymer material, wherein the synthetic flashing material comprises a poly(vinyl butyrate) in an amount of 75% or more by total weight of the synthetic flashing material,
   wherein the synthetic flashing material has a content of metals of 5 wt. % or less,
   wherein the polymer material has a melt flow index of 0.1-10 g/10 min as measured according to ISO 1133 at a load of 2.16 kg and a temperature of 180° C., and
   wherein the polymer material has a melting temperature ($T_m$) in the range of 75-110° C.

2. The synthetic flashing material of claim 1, wherein the polymer material has a modulus of elasticity as measured according to ISO 527 of 0.6-2.0 MPa.

3. The synthetic flashing material of claim 1, wherein the polymer material has a shore A hardness as measured according to ISO 7619-1 in a range of 25-65.

4. The synthetic flashing material of claim 1, wherein the polymer material has an elongation at break as measured according to ISO 527 of 250-400%.

5. The synthetic flashing material of claim 1, wherein the polymer material has a yield stress as measured according to ISO 527 of 9-22 MPa.

6. The synthetic flashing material of claim 1, wherein the polymer material comprises one or more selected from the group consisting of
   a thermoplastic polyurethane,
   a polyisobutene,
   a polycaprolactone,
   a polyester,
   a thermoplastic olefin,
   a polyolefin,
   a silicone,
   a siloxane,
   a thermoplastic elastomer, including a vulcanised thermoplastic elastomer and a styrenic block copolymer,
   a poly(vinyl chloride),
   a poly(vinyl butyral),
   a styrene butadiene copolymer including a poly(styrene-butadiene-styrene), a poly(styrene-ethylene/butadiene-styrene), and
   a poly(styrene-ethylene/propylene-styrene), and
   a copolymer of ethylene and vinylacetate.

7. The synthetic flashing material of claim 1, wherein the polymer material comprises one or more elastomers.

8. The synthetic flashing material of claim 1, wherein the polymer material comprises one or more plasticisers.

9. The synthetic flashing material of claim 1, having a Solar Reflectance Index (SRI) of 20 or higher.

10. The synthetic flashing material of claim 1, being substantially free of heavy metals.

11. The synthetic flashing material of claim 1, being deformable.

12. The synthetic flashing material of claim 1, further comprising at least one release sheet for storage.

13. The synthetic flashing material of claim 1, further comprising one or more additives selected from the group consisting of
   an ultraviolet blocking agent,
   an antioxidant,
   a flame retardant,
   a blowing agent,
   a processing aid,
   a pigment,
   a dye,
   a filler,
   an antibacterial agent,
   a release agent,
   a heat stabilizer,
   a light stabilizer,
   a compatibilizer,
   an inorganic material additive,
   a surfactant,
   a coupling agent,
   an impact-reinforcing agent,
   a lubricant,
   a weather-resistant agent,
   an adhesion aid,
   an adhesive, and
   any combination thereof.

14. The synthetic flashing material of claim 13, wherein the additive comprises one or more flame retardants.

15. A method for providing water-proofing and/or weather-proofing to a construction, comprising:
   i) applying the synthetic flashing material of claim 1 to a surface of the construction.

16. The method of claim 15, further comprising treating the applied synthetic flashing material to produce a treated synthetic flashing material, wherein the treating is performed mechanically, thermally, chemically, (ultra) sonically, and/or using electromagnetic radiation.

17. The method of claim 16, wherein the treated synthetic flashing material is less deformable than the synthetic flashing material before treatment.

18. The method of claim 15, wherein water-proofing and/or weather-proofing is provided to a transition between a roof and a chimney, a skylight and/or a dormer window of the construction.

19. The method of claim 15, wherein the synthetic flashing material is used for a flat surface of the construction as well as for a transition between different construction elements of the construction.

20. The synthetic flashing material of claim 7, wherein the one or more elastomers comprise a copolymer prepared from at least two monomers selected from the group consisting of
- an ethylene,
- a propylene,
- a butadiene,
- an isobutene,
- an isoprene,
- a chloroprene,
- a vinylacetate,
- a styrene,
- an acrylonitrile, and
- a (meth)acrylic acid ester.

21. The synthetic flashing material of claim 8, wherein the one or more plasticisers are one or more selected from the group consisting of
- an aromatic diester,
- an aliphatic diester,
- an aromatic sulphonamide,
- an aromatic phosphate ester,
- an alkyl phosphate ester,
- a dialkylether aromatic ester,
- a dialkylether diester,
- a tricarboxylic ester,
- a polymeric polyester plasticiser,
- a polyglycol diester,
- an alkyl alkylether diester,
- an aromatic trimester,
- an epoxidized ester,
- an epoxidized oil,
- a chlorinated hydrocarbon,
- a chlorinated paraffin,
- an aromatic oil,
- an alkylether monoester,
- a naphthenic oil,
- an alkylmonoester,
- a glyceride oil,
- a paraffinic oil,
- a silicone oil,
- a linseed oil,
- a citrate plasticiser,
- a processed castor oil,
- a raw castor oil,
- a derivative of castor oil,
- a butyl ricinoleate, and
- a sebacate plasticiser.

* * * * *